United States Patent [19]

Lech, Jr.

[11] 4,418,812

[45] Dec. 6, 1983

[54] CLUTCH DRIVEN PLATE ASSEMBLY WITH A FLOATING HUB

[75] Inventor: Thaddeus Lech, Jr., Sterling Heights, Mich.

[73] Assignee: Borg-Warner Corporation, Chicago, Ill.

[21] Appl. No.: 248,106

[22] Filed: Mar. 27, 1981

[51] Int. Cl.³ ............................................... F16D 3/14
[52] U.S. Cl. ............................... 192/106.2; 192/30 V; 192/70.17; 192/70.19; 192/106.1; 464/67
[58] Field of Search ............... 192/106.1, 106.2, 70.17, 192/70.19, 70.16, 30 V; 464/66, 68, 67, 149

[56] References Cited

U.S. PATENT DOCUMENTS

| Re. 27,126 | 5/1971 | Gingery | 192/70.13 |
|---|---|---|---|
| 2,026,733 | 1/1936 | Fast | 192/69 |
| 2,097,627 | 11/1937 | Lewis | 464/68 X |
| 2,276,416 | 3/1942 | Nutt | 192/68 |
| 3,181,673 | 5/1965 | Poliseo | 192/41 R X |
| 3,218,828 | 11/1965 | Thelander | 192/106.1 X |
| 3,299,671 | 1/1967 | Castelet | 464/68 X |
| 3,362,194 | 1/1968 | Bertelson et al. | 192/106.2 X |
| 3,428,155 | 2/1969 | Binder et al. | 192/106.1 |
| 3,800,931 | 4/1974 | Maucher | 192/106.2 |
| 4,016,962 | 4/1977 | Black | 192/70.2 |
| 4,270,645 | 6/1981 | Beccaris | 192/106.1 |

FOREIGN PATENT DOCUMENTS

| 1285339 | 12/1968 | Fed. Rep. of Germany | 192/106.1 |
|---|---|---|---|
| 44-31004 | 12/1969 | Japan | 192/106.2 |
| 45-27486 | 9/1970 | Japan | 192/106.2 |
| 968623 | 9/1964 | United Kingdom | 192/106.1 |
| 731117 | 4/1980 | U.S.S.R. | 464/149 |

OTHER PUBLICATIONS

U.S. patent application Ser. No. 212,925 filed Dec. 4, 1980; Taddeus Lech, Jr.

Primary Examiner—Rodney H. Bonck
Attorney, Agent, or Firm—James A. Geppert

[57] ABSTRACT

A clutch driven plate assembly for use in an automotive vehicle adapted to dissipate the irregular impulses of the vehicle engine when the transmission is in neutral, the clutch is engaged and the engine is at idle rpm. The assembly includes an inner hub in operative engagement with the transmission input shaft, an outer hub encompassing the inner hub, cooperating conical teeth on the inner and outer hubs, a back plate in engagement with the inner hub, and resilient means between the back plate and the outer hub.

13 Claims, 8 Drawing Figures

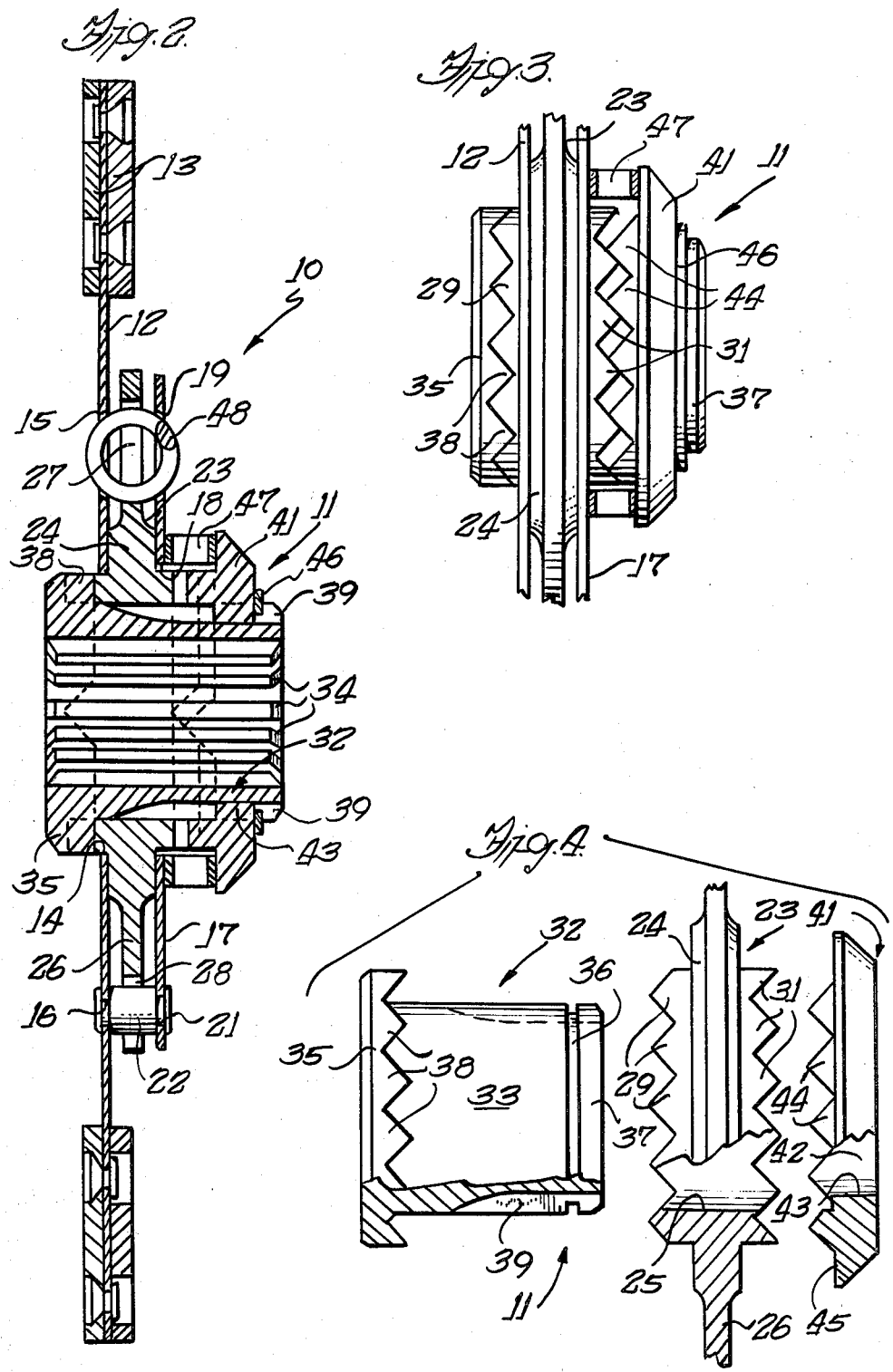

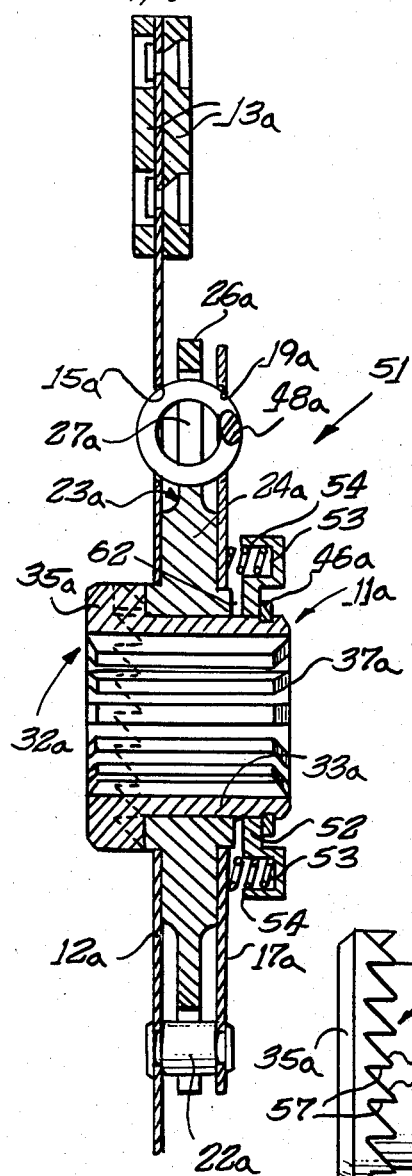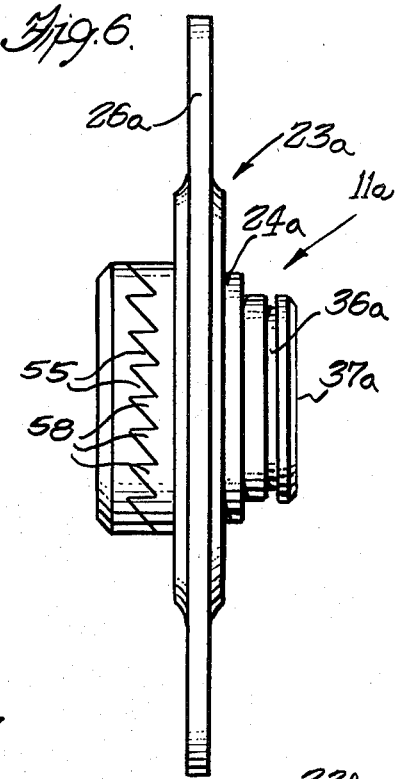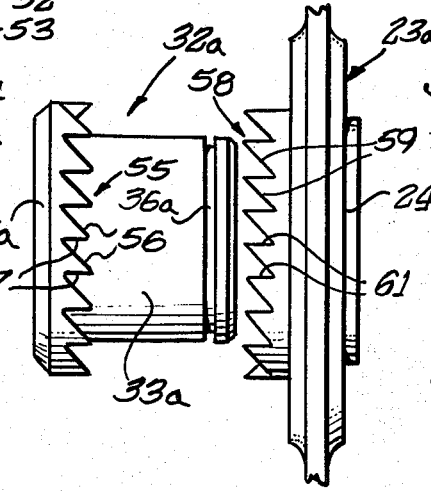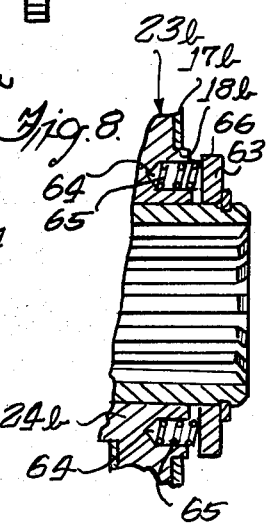

CLUTCH DRIVEN PLATE ASSEMBLY WITH A FLOATING HUB

BACKGROUND OF THE INVENTION

In a conventional friction clutch for a manual transmission in an automotive vehicle, the engine has power and inertia impulses which drive the engaged clutch with an irregular series of thrusts when the transmission is in neutral and the engine is at idle rpm. These impulses will be transmitted to the transmission gears which become excited, resulting in oscillation through their backlash space to produce objectionable rattle. In my copending application Ser. No. 212,925, I disclose a driven plate assembly utilizing a helical connection between an inner hub and an outer hub to allow relative axial movement between the hubs to dissipate the engine impulses. The present invention relates to another approach to this problem to simplify parts construction.

SUMMARY OF THE INVENTION

The present invention comprehends the provision of a clutch driven plate assembly having a novel hub arrangement to dissipate engine impulses which had previously resulted in objectionable transmission gear rattle with the clutch engaged, the transmission in neutral and the engine at idle rpm. The hub arrangement includes an axially elongated inner hub in operative engagement with the transmission input shaft, an outer hub encompassing the inner hub and having conical teeth complementary to and engaging conical teeth at one end of the inner hub and an integral hub flange providing an operative connection with the clutch friction facings, a back plate abutting a stop at the opposite end of the inner hub and resilient means acting between the back plate and the outer hub. The conical teeth allow axial movement of the inner hub relative to the outer hub.

The present invention also comprehends the provision of a clutch driven plate assembly having a novel hub assembly including an inner hub, an outer hub encompassing the inner hub and having an integral flange and a back plate in splined engagement with the inner hub. The outer hub has conical teeth on the opposite surfaces thereof with the teeth on one surface engaging complementary teeth on a flange formed on the inner hub, and the teeth on the opposite surface engaging complementary teeth formed on the back plate. Resilient means are interposed between the back plate and the outer hub so as to allow axial movement of the inner hub and back plate relative to the outer hub.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view taken on the irregular line 2—2 of FIG. 1.

FIG. 3 is a side elevational view of the hub assembly portion of the clutch driven plate assembly.

FIG. 4 is an exploded side elevational view of the assembly of FIG. 3 with portions broken away.

FIG. 5 is a cross sectional view similar to FIG. 2 but showing an alternate form of hub assembly.

FIG. 6 is a side elevational view of the hub assembly of FIG. 5 with the back plate omitted.

FIG. 7 is an exploded side elevational view of the inner and outer hubs of FIG. 6.

FIG. 8 is a partial cross sectional view of the hub assembly of FIG. 5 with an alternate back plate.

DESCRIPTION OF THE PREFERRED EMBODIMENTS

Figure 1:
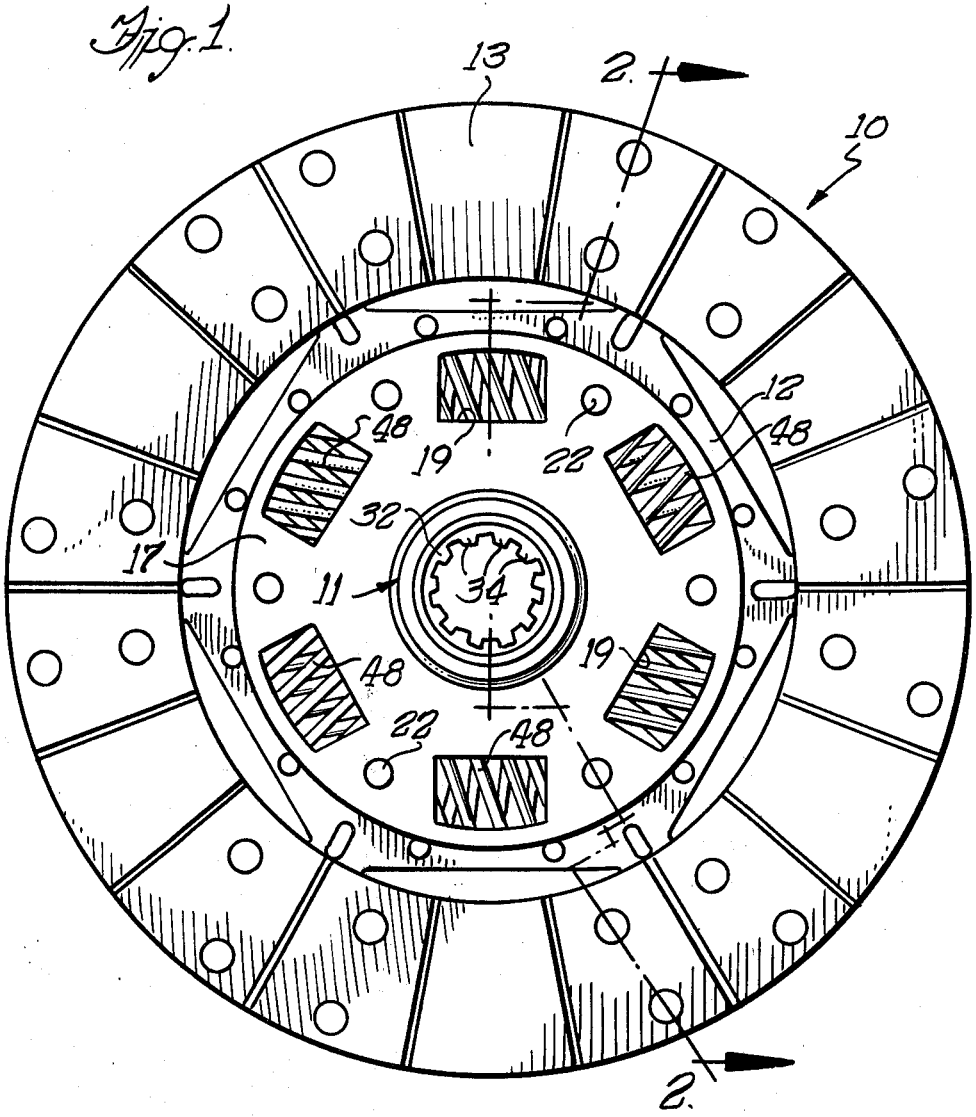
FIG. 1 is a rear elevational view of an embodiment of the clutch driven plate assembly of the present invention.

Referring more particularly to the disclosure in the drawings wherein are shown illustrative embodiments of the present invention, FIGS. 1 through 4 disclose a clutch driven plate assembly 10 including a hub assembly 11, a clutch plate 12 having friction facings 13 on the opposite surfaces thereof adjacent the periphery and adapted to be positioned between friction surfaces of a flywheel and a pressure plate (not shown), and a spring retainer plate 17. The clutch plate 12 includes a central opening 14, a plurality of circumferentially equally spaced arcuate spring windows 15 and a plurality of openings 16 arranged in a circle.

The spring retainer plate 17 has a central opening 18, a plurality of circumferentially equally spaced arcuate spring windows 19 axially aligned with the windows 15 and a plurality of openings 21 axially aligned with openings 16 to receive spacer rivets 22 to secure the clutch plate 12 and spring retainer plate 17 together.

The hub assembly 11 includes an outer hub 23 and an inner hub 32. The outer hub 23 includes an enlarged central portion 24 with a cylindrical passage 25 therethrough and an integral radially extending flange 26 positioned centrally between and parallel to the clutch plate 12 and spring retainer plate 17. The flange 26 has a plurality of arcuate windows 27 axially aligned with windows 15 and 19 of the clutch plate and spring retainer plate, respectively, and a plurality of peripheral notches 28 to accommodate the spacer rivets 22; the notches being of a length to allow limited relative rotation between the joined plates and the hub flange. Also, the opposed surfaces of the central portion 24 are provided with forwardly extending conical teeth 29 and rearwardly extending conical teeth 31.

The inner hub 32 consists of a generally smooth cylindrical barrel 33 having a central passage with internal splines 34 adapted to receive the splined end of the transmission input shaft (not shown), a radial flange 35 at the forward end of the barrel and an annular groove 36 adjacent the rear end 37 of the barrel. The flange is formed with a plurality of rearwardly extending conical teeth 38 complementary to the teeth 29 on the outer hub. The smooth exterior surface of the barrel has two or more axial grooves 39 formed therein extending from the rear end 37 forward to terminate short of the flange 35.

A back plate 41 has a central opening 42 with internal splines 43 corresponding to the groove 39 and forwardly extending conical teeth 44 complementary to the teeth 31 on the inner hub 32. The opening 42 conformably receives the smooth barrel 33 with the splines 43 received in the grooves 39, and a snap ring 46 in the annular groove 36 retains the back plate on the barrel. The back plate extends radially outward beyond the teeth to provide a surface 45 to be engaged by a flat coil spring 47 encompassing the engaging teeth 31,44 to yieldably bias the back plate 41 and inner hub 32 rearwardly relative to the outer hub 23.

In the normal position of the hub assembly with the clutch disengaged, as seen in FIGS. 2 and 3, the forward teeth 29,38 are fully engaged and the rearward teeth 31,44 partially engaged; the spacing between the outer hub 23 and the back plate 41 being limited such that neither set of teeth can be completely disengaged. This clutch assembly operates in the same manner as a conventional assembly except for the action of the hubs 23 and 32 at idle rpm and in neutral transmission position. With the clutch engaged, the engine impulses act to rotate the clutch plate 12, which in turn rotates the outer hub 23 through damper springs 48 in the aligned sets of windows 15,19 and 27 to urge the teeth 29 and 38 to ramp out of engagement and move the inner hub 32 axially forwardly on the transmission input shaft, and the spring 47 acts to return the teeth 29,38 back into engagement. The energy of the impulses is used to operate the hubs in the above manner rather than transmitting the undiminished impulses to the vehicle transmission to cause its gears to rattle.

In the drive mode of the vehicle, the hubs will not operate as described above since the camming action of the rear teeth 31,44 will balance against the disengaging force of the front teeth 29,38. Likewise, in the coast mode, the camming action of the front teeth will balance against the disengaging force of the rear teeth.

FIGS. 5 through 7 disclose an alternate embodiment of clutch plate assembly 51 wherein like parts have the same reference numeral with a script a. This clutch plate assembly 51 comprises a hub assembly 11a, a clutch plate 12a carrying friction facings 13a, and a spring retainer plate 17a secured to the clutch plate by spacer rivets 22a. The hub assembly includes an outer hub 23a having a central portion 24a and a radial flange 26a, an inner hub 32a having a barrel 33a with a flange 35a at the forward end and an annular groove 36a on the smooth barrel surface adjacent the rear end 37a, and a back plate 52. The back plate 52 is retained on the barrel by a snap ring 46a and has a plurality of spring pockets 53 formed therein to receive the ends of a plurality of axially extending compression coil springs 54 having their opposite ends abutting the spring retainer plate 17a to yieldably bias the back plate and inner hub rearwardly relative to the outer hub.

The inner hub flange 35a has a plurality of one-way conical teeth 55 formed thereon, each tooth having an inclined surface 56 and a straight side 57. Likewise, the central portion of the outer hub has a plurality of complementary teeth 58 facing the teeth 55, each having an inclined surface 59 and a straight side 61. Also, the clutch plate, outer hub flange and spring retainer plate have a plurality of axially aligned windows 15a, 27a and 19a, respectively, to receive damper springs 48a. This assembly operates in substantially the same manner with the transmission in neutral position, however, in the drive mode, the teeth 55 and 58 ramp out of engagement until the gap 62 closes; the teeth remaining in a partially engaged position. In the coast mode, the torque is transmitted through the straight sides 57,61 of the teeth.

FIG. 8 discloses an optional construction for the embodiment of FIGS. 5 through 7 wherein all of the elements are identical except that the back plate 63 is flat and the spring pockets 64 for the coil springs 65 are formed in the central portion 24b of the outer hub 23b, and the central opening 18b of the spring retainer plate 17b is enlarged so that this plate is journalled on a shoulder 66 on the central portion 24b.

Although the several embodiments disclose a damped clutch arrangement, the floating hub construction can obviously be utilized with a solid clutch plate wherein the radial flange of the outer hub carries the friction facings; the clutch plate, spring retainer plate and damper springs being omitted. Also, the disclosed arrangement of the inner hub could be reversed with the inner hub flange carrying the conical teeth at the rear end of the inner hub, and the stop ring in the annular groove and the back plate located on the forward end of the inner hub without altering the operation of the floating hub.

I claim:

1. A clutch driven plate assembly for an automotive vehicle clutch driving a transmission input shaft, comprising a multi-part hub assembly including an inner hub operatively connected to the transmission input shaft, an outer hub encompassing said inner hub and having an integral radial flange operatively connected to friction facings located between a engine flywheel and a clutch pressure plate, said inner hub having a radial flange at one end and a stop ring adjacent the opposite end, said radial flange having a surface facing the outer hub flange, a back plate positioned on said inner hub adjacent said stop ring, a plurality of intermeshing camming surfaces formed on the flange surface and facing surface of the outer hub so that relative rotation between the hubs will result in axial motion of the inner hub on the transmission shaft, and resilient means between said back plate and outer hub to yieldably bias the camming surfaces into engagement.

2. A clutch driven plate assembly as set forth in claim 1, including a clutch plate carrying said friction facings at the outer periphery thereof, a spring retainer plate secured to said clutch plate to sandwich said outer hub flange therebetween, said plates and hub flange having axially aligned sets of circumferentially spaced windows therein, and damper springs received in each set of windows.

3. A clutch drive plate assembly as set forth in claim 1, in which said camming surfaces comprise a plurality of conical teeth on said outer hub surface and inner hub flange.

4. A clutch driven plate assembly for an automotive vehicle clutch driving a transmission input shaft, comprising a multipart hub assembly including an inner hub operatively connected to the transmission input shaft, an outer hub encompassing said inner hub and having an integral radial flange operatively connected to friction facings located between an engine flywheel and a clutch pressure plate, said inner hub having a radial flange at one end and a stop ring adjacent the opposite end, said radial flange having a surface facing the outer hub, a plurality of interengaging conical teeth formed on said flange surface and facing surface of the outer hub so that relative rotation betwen the hubs will result in relative axial motion therebetween, a back plate positioned on said inner hub abutting said stop ring, and resilient means compressed between said outer hub and said back plate to yieldably bias the conical teeth into engagement.

5. A clutch driven plate assembly as set forth in claim 4, in which said back plate has a surface facing said outer hub, said back plate surface and the facing surface of the outer hub having interengaging conical teeth formed thereon.

6. A clutch driven plate assembly as set forth in claim 5, in which said conical teeth on said inner hub flange, outer hub and back plate have oppositely inclined surfaces, said inner and outer hub teeth being fully engaged when said outer hub and back plate teeth are partially engaged and vice versa.

7. A clutch driven plate assembly as set forth in claim 6, in which said resilient means comprises a coil spring encompassing said interengaged outer hub and back plate teeth.

8. A clutch driven plate assembly as set forth in claim 6, in which the spacing between the outer hub and back plate with the inner and outer hub teeth fully engaged is insufficient to allow complete disengagement of the outer hub and back plate teeth.

9. A clutch driven plate assembly as set forth in claim 6, in which said inner hub has at least two grooves on the exterior surface thereof and said back plate has a corresponding number of internal splines received in said grooves to prevent relative rotation therebetween.

10. A clutch driven plate assembly as set forth in claim 4, in which said conical teeth comprise alternate inclined surfaces and axially extending straight sides.

11. A clutch driven plate assembly as set forth in claim 10, in which said resilient means consist of a plurality of circumferentially equally spaced axially extending compression springs extending between the back plate and the outer hub.

12. A clutch driven plate assembly as set forth in claim 11, in which spring pockets are formed in said back plate to receive the ends of the compression springs.

13. A clutch driven plate assembly as set forth in claim 11, in which said outer hub has a plurality of spring pockets formed therein to receive one end of each compression spring.

* * * * *